United States Patent [19]

Kataczynski

[11] Patent Number: 4,629,154

[45] Date of Patent: Dec. 16, 1986

[54] SHOCK ABSORBER

[75] Inventor: Nachman Kataczynski, Nethanya, Israel

[73] Assignee: Urdan Industries Ltd., Nethanya, Israel

[21] Appl. No.: 746,862

[22] Filed: Jun. 20, 1985

[51] Int. Cl.$^4$ ............................................. F16F 7/00
[52] U.S. Cl. ................................... 248/610; 248/636; 267/63 A; 267/141.3; 267/153
[58] Field of Search ........................... 248/610–613, 248/317, 342–345, 634, 636, 638, 560; 267/63 A, 141.3, 153

[56] References Cited

U.S. PATENT DOCUMENTS

| | | | |
|---|---|---|---|
| 809,356 | 1/1906 | Brown | 248/610 |
| 949,962 | 2/1910 | Nichols | 248/610 |
| 957,287 | 5/1910 | Woodley | 248/610 |
| 1,281,128 | 10/1918 | Borer | 248/610 |
| 2,316,827 | 4/1943 | Wessenger | 248/610 |
| 2,496,710 | 2/1950 | Goddard | 248/610 |
| 3,891,175 | 6/1975 | Hawley | 248/317 |
| 4,307,547 | 12/1981 | Kern | 248/317 |

FOREIGN PATENT DOCUMENTS

| | | | |
|---|---|---|---|
| 843383 | 5/1952 | Fed. Rep. of Germany | 248/660 |
| 896278 | 10/1953 | Fed. Rep. of Germany | 248/613 |
| 1201775 | 2/1961 | Fed. Rep. of Germany | 248/610 |

Primary Examiner—Reinaldo P. Machado
Assistant Examiner—A. Chin-Shue
Attorney, Agent, or Firm—Benjamin J. Barish

[57] ABSTRACT

A shock absorber comprises a rigid core extending through and fixed within a shock absorbing body, the opposite ends of the rigid core projecting from the opposite ends of the shock absorbing body for coupling between first and second mounting member. The shock absorber further includes a coupling member coupling one end of the rigid core to its respective mounting member such that a force applied in a compressing direction is transmitted to the latter mounting member in a non-cushioned manner, whereas the force applied in the opposite or tensioning direction is transmitted in a cushioned manner via the shock absorbing body. One advantage of the described construction is that, should the shock absorbing body be destroyed by the shock, the mounting members can still be disassembled in a simple and convenient manner.

17 Claims, 4 Drawing Figures

SHOCK ABSORBER

BACKGROUND OF THE INVENTION

The present invention relates to shock absorbers mountable between a first member and a second member for absorbing the shock applied to the first member before it is transmitted to the second member. The invention is particularly useful in unidirectional shock absorbers, i.e., shock absorbers wherein the force applied to one member is transmitted to the other member in a cushioned (shock-absorbing) manner if applied in one direction, e.g., compression, but in a non-cushioned manner if applied in the opposite direction, e.g., tension. Accordingly, the invention is described below particularly with respect to such an application.

Many types of shock absorbers have been devised and are now in use. Most shock absorbers are bidirectional, i.e., they absorb the force whether applied in either direction. However, there are many applications for unidirectional shock absorbers, wherein the force applied to one member is absorbed by the shock absorber before being transmitted to the second member only if that force is applied in one direction, e.g., tending to compress the shock absorber. An example of an application of a unidirectional shock absorber is wherein a heavy object, such as a lighting fixture or a machine fixture, is to be supported in suspension from an overhead support, such as a ceiling, in a non-cushioned manner, the shock absorber being effective to cushion any shock applied to the fixture in the upper (or lateral) direction tending to compress the shock absorber.

An object of the present invention is to provide a shock absorber of an improved, simplified construction having a few simple parts which can be manufactured at low cost, and which can be assembled and disassembled in a quick and convenient manner. Another object of the invention is to provide a shock absorber for absorbing the shock only when applied in one direction. A further object of the invention is to provide a shock absorber of a construction such that, should the elastic shock-absorbing body be destroyed by the force of the shock, there will still be a positive connection between the mounting and the member mounted to it, and moreover, it will still be possible to remove the latter member in a simple and convenient manner.

SUMMARY OF THE INVENTION

According to a broad aspect of the present invention, there is provided a shock absorber mountable between first and second mounting members, comprising: a shock absorbing body; a rigid core extending through and fixedly embedded within the shock absorbing body; the rigid core including a first end projecting from one side of the shock absorbing body for coupling same to the first mounting member, and a second end projecting from the opposite side of the shock absorbing body for coupling same to the second mounting member; and a coupling member engageable with the second projecting end of the rigid core for coupling same to the second mounting member such that a tensile force applied to the first mounting member in the direction away from the second mounting member is transmitted to the second mounting member via the rigid core and the coupling member, and independently of the shock absorbing body; whereas a compressive force applied to the first mounting member in the opposite direction, towards the second mounting member, is transmitted to the second mounting member via the shock absorbing body.

In accordance with further preferred features of the invention as included in the described embodiment, the second projecting end of the rigid core is formed with a flange, the coupling member engaging the inner face of the flange to couple same to the second mounting member. In addition, the second mounting member includes a socket for receiving the shock absorbing body therein; the coupling member being received through said sleeve to engage the inner face of said flange of the rigid core to couple same to the second mounting member.

It will thus be seen that the coupling member may be made of rigid material so that the force applied to the first mounting member in the first or compressing direction is transmitted to the second mounting member in a non-cushioned manner, whereas the force applied to the first mounting member in the opposite or tensioning direction is transmitted to the second mounting member in a cushioned manner via the shock absorbing body.

A shock absorber constructed in accordance with the foregoing features provides a number of important advantages. Thus, it may be constituted of a few simple parts which can be manufactured at low cost, and which can be assembled and disassembled in a quick and convenient manner. Further, by using a rigid member for the coupling member, the shock absorber becomes a unidirectional one, absorbing the shock only if applied in one (compressing) direction. In addition, in case the shock-absorbing body is destroyed by the shock, there will still be a positive connection between the mounting members. Still further, even should the shock-absorbing body be destroyed by the shock, the mounting members can still be disassembled in a simple and convenient manner.

Additional features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
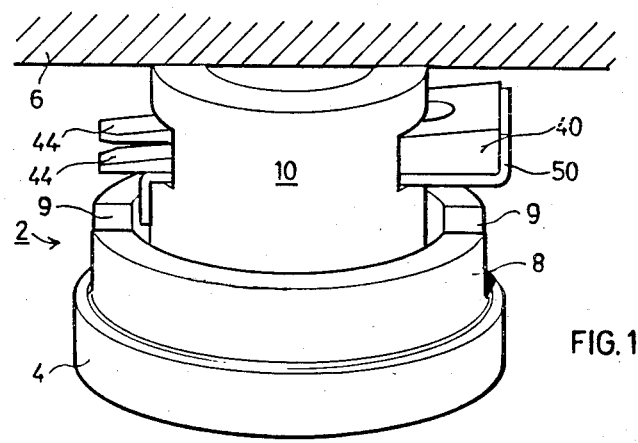
FIG. 1 is a three-dimensional view illustrating one form of shock absorber constructed in accordance with the present invention.
Figure 2:
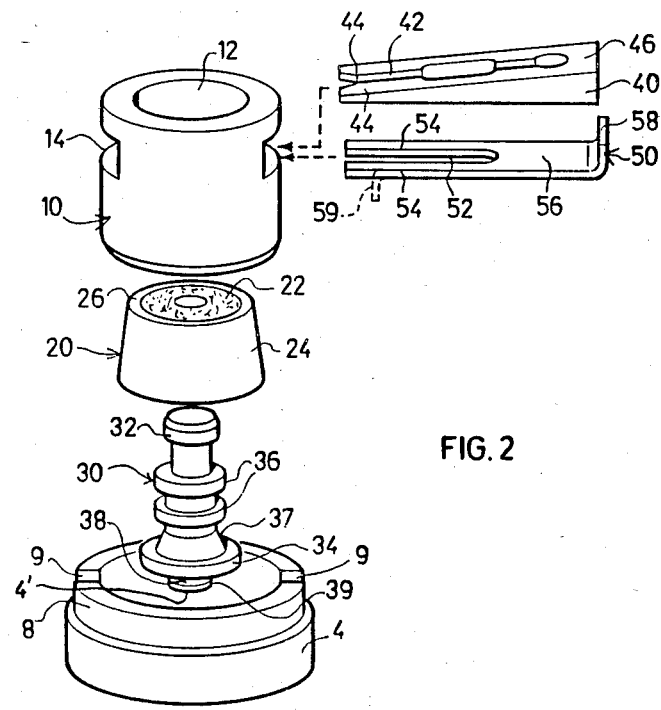
FIG. 2 is an exploded view illustrating the main elements of the shock of FIG. 1.

The shock absorber illustrated in the drawings, therein generally designated 2, is adapted to be mounted between two members 4 and 6. For example, member 4 may be a part of a machine fixture or light fixture to be supported in suspension from member 6, which may be an overhead support or the ceiling, such that a downwardly-directed or tensile force (e.g., the weight of the fixture) is to be transmitted to the supporting member 6 in an uncushioned manner, whereas an upwardly-directed or compressive force, as well as a lateral force, such as produced by impacts on member 4, are to be cushioned before being transmitted to the supporting member 6. Preferably, member 4 includes a ring 8 formed with a pair of opposed notches 9, the ring circumscribing the lower portion of the shock absorber so as to limit the lateral movement thereof, as will be described more fully below.

The shock absorber 2 illustrated in the drawings comprises five basic omponents, namely, a sleeve 10 adapted to be secured to supporting member 6; a shock absorbing body 20 receivable within sleeve 10; a rigid core 30 extending through and fixed within the shock absorbing body 20; a coupling member 40; and a locking member 50. Each of these members is described more particularly below.

Thus, sleeve 10 is of rigid material, such as metal, and has an outer cylindrical configuration. It is to be secured to supporting member 6 in any suitable manner, for examPle by welding. The sleeve is formed with an axially-extending bore or socket 12 of conical configuration, the diameter of the socket decreasing towards the end of the sleeve (upper) to be secured to mounting member 6. In addition, sleeve 10 is formed with a transversely-extending bore or opening 14 of substantially rectangular cross-section adjacent to the end of the sleeve to be secured to supporting member 6.

The shock absorbing body 20 is to be received within the conical socket 12 of sleeve 10, and therefore has an outer conical configuration complementary to that of socket 12 This body 20 is constituted of an inner filler or body 22 of resilient cushioning material, such as a foamed plastic, and an outer rigid jacket 24, such as of metal. Jacket 24 is formed with rims 26 at its opposite ends for anchoring same to the inner cushioning body 22.

Figure 3:
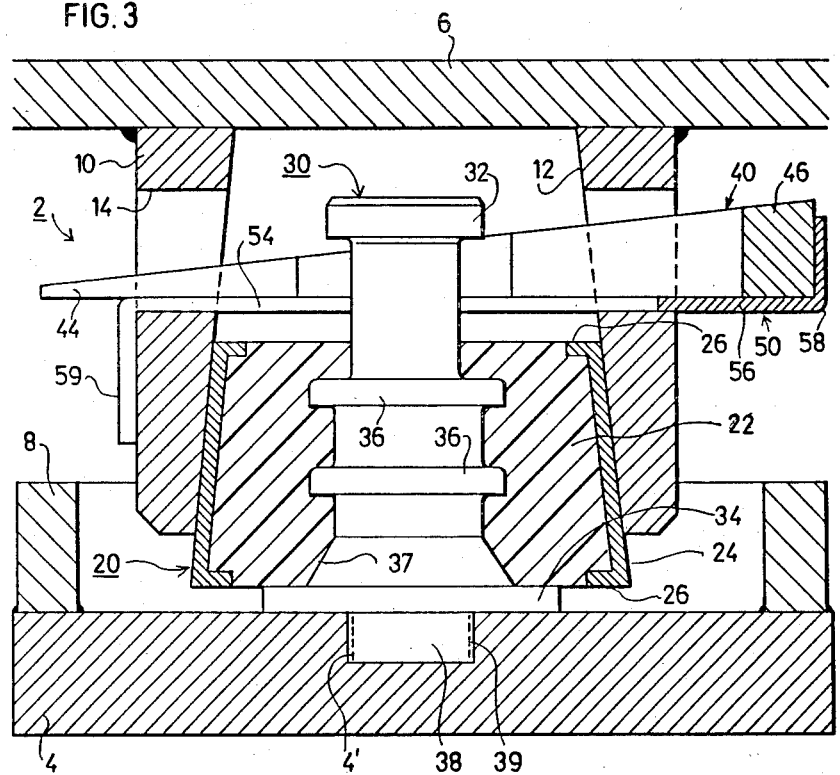
FIG. 3 is a longitudinal sectional view illustrating the shock absorber of FIG. 1 mounted between the first and second mounting members.
Figure 4:
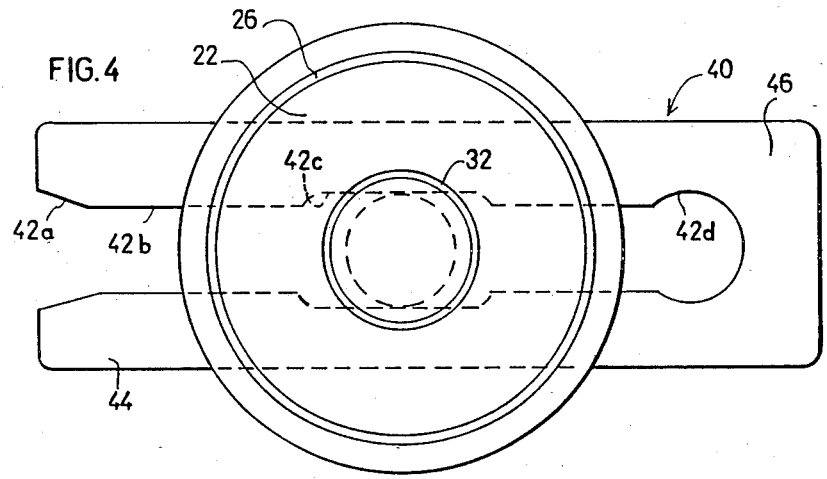
FIG. 4 is a top plan view illustrating only the shock absorbing body, its rigid core and the coupling member.

Core 30 of the illustrated shock absorber is of strong rigid material, such as metal, and extends through the shock absorbing body 20 but projects from the opposite ends of this body as shown particularly in FIG. 3. Thus, one end of the rigid core 30 is formed with a first flange 32 projecting outwardly of the corresponding face of the shock absorbing body 20, and with a second flange 34 at the opposite end of the core, adjacent to the respective face of the inner cushioning body 22 but spaced from rim 26 of its rigid jacket 24. Core 30 is formed with two further flanges 36 in its central region embedded within the cushioning material 22 of the shock absorbing body 20, these flanges serving to firmly anchor the core within the body. The juncture between the central portion of the core 30 and its flange 34 is preferably tapered, as shown at 37. In addition, this end of core 30 terminates in a cylindrical projection 38 which is externally threaded as shown at 39, for coupling to mounting member 4 via an internally-threaded bore 4' formed therein.

Coupling member 40 is of wedge-shape and is formed with a longitudinally-extending slot 42 for most of its length, dividing it into two bifurcations 44 connected at one end by a web 46. Slot 42 is specially configured so as to include an outwardly-tapered end portion 42a; an intermediate portion 42b of uniform width except for a central part 42c of slightly larger width; and an end portion 42d defining a circular arc of slightly more than 180°. Thus, the coupling member 40 generally resembles a common type of clothespin, except that its outer configuration is generally rectangular, and its thickness is tapered so as to provide a wedge-shape.

Locking member 50 is of similar rectangular shape as the coupling wedge 40, except that locking member 50 is in the form of a strip or plate of uniform thickness. Like the coupling wedge 40, locking member 50 is also formed with a longitudinally-extending slot 52 terminating short of one end so as to define two bifurcations 54 joined together by a connecting end web 56. The latter end of the locking member 50 is bent in one direction as shown at 58, and after insertion into the shock absorber its opposite end may be bent in the opposite direction as shown at 59, to thereby lock the elements of the shock absorber in assembled condition, as will be described more particularly below.

The shock absorber is assembled in the following manner: first, sleeve 10 is secured to supporting member 6 in any suitable manner, such as by welding, with the narrow end of the sleeve against the supporting member 6. The shock absorbing body 20, with the rigid core 30 embedded therein, is then inserted into the opposite end of the conical socket 12 and pressed upwardly so that flange 32 of the rigid core 30 is in alignment with or slightly above the upper part of the transverse opening 14 through the sleeve 10. At this time, the wedge-shaped coupling member 40, and the locking member 50 under it, are inserted through opening 14 of the sleeve until the upper face of the coupling member engages the under face of the core flange 32. During this insertion of members 40 and 50, bend 58 of the locking member 50 engages the end face of the coupling member 40, so that the assembler can conveniently press both members 40 and 50 together further into opening 14. The wedge shape of the coupling member 40, engageing flange 32 of the rigid core 30, draws the cushioning body further into the socket 12 so that the shock absorbing body 20 is firmly held within the socket. At this time, end 59 of locking member 50 is turned downwardly to overlie the outer face of sleeve 10, which thereby locks all the foregoing elements in their illustrated assembled condition.

Following the assembly of the shock absorber 2, member 4 to be mounted via the shock absorber to member 6, may now be applied to the rigid core 30 via the external 14 threaded pin 38 in the core received in the internally threaded bore 4' in member 4.

In the illustrated arrangement, all the elements are of rigid material, for example metal, except for the cushioning material 22 within the shock absorbing body 20, which may be of foamed polyurethane, for example.

It will thus be seen that any tensile force applied to mounting member 4, i.e , in the downward direction way from mounting member 6, will be transmitted from member 4 to member 6 via the rigid core 30, coupling member 40, and socket 10, all of which members are of rigid material. Accordingly, such a tensile force, e.g., the weight of a fixture supported by member 4, will be transmitted in a non-cushioning manner, i.e., independently of the shock-absorbing body 20, to the mounting member 6.

However, any compressive force applied to member 4, i.e., in the upward direction towards supporting member 6, will be transmitted via flange 34, the cushioning material 22 within the shock absorbing body 20, and sleeve 10, to the mounting member 6. Thus, such a force, which may be produced by an impact applied to member 4, will be transmitted via the cushioning body 22 and will therefore be absorbed by that body before being transmitted to mounting member 6.

As indicated earlier, in many applications it may be desired to limit the lateral deflection of the shock absorber Ring 8, welded to the upper face of the mounting member 4, is provided for this purpose. This ring circumscribes the lower portion of the shock absorber, and includes opposed notches 9 aligned with the wedge-shaped coupling member 40 and the locking member 50, so as to accommodate these members upon compression of the shock-absorbing body 20.

Thus, the invention provides a simple and inexpensive shock absorber which can be produced with but a few simple parts, which parts can be quickly assembled and also quickly disassembled, the latter being done by merely bending up end 59 of the locking member 50, and removing it and the locking wedge 40. In addition, should the shock-absorbing body 20 be destroyed by the shock, a positive connection is still maintained between members 4 and 6 by means of the rigid core 30, sleeve 10, coupling wedge 40, and locking member 50. Also, should the shock-absorbing body 20 be destroyed, the parts still can be easily disassembled by merely removing the locking member 50 and the coupling wedge 40.

While the invention has been described with respect to one preferred embodiment, it will be appreciated that many variations, modifications and other applications of the invention may be made.

What is claimed is:

1. A shock absorber mountable between first and second mounting members, comprising:
   a shock absorbing body of resilient elastomeric material;
   a rigid core extending through and fixedly embedded within said shock absorbing body;
   said rigid core including a first end projecting from one side of the shock absorbing body for coupling same to said first mounting member, and a second end projecting from the opposite side of said shock absorbing body and formed with a flange for coupling to said second mounting member;
   a sleeve adapted to be fixed to said second mounting member, said sleeve being formed with an axially-extending socket for receiving said shock absorbing body, and with a transversely extending opening at the flanged end of the rigid core;
   and a coupling member receivable through said opening in the sleeve so as to engage a face of said flange and thereby to couple said rigid core to the sleeve and to the second mounting member, such that a force applied to said first mounting member in a first direction away from said second mounting member is transmitted to said second mounting member via said rigid core and coupling member, whereas a force applied to said first mounting member in the opposite direction, towards said second mounting member, is transmitted to said second mounting member via said rigid core and said shock absorbing body.

2. A shock absorber according to claim 1, wherein said coupling member is of rigid material so that the force applied to the first mounting member is said first direction is transmitted to the second mounting member in a non-cushioned manner, whereas the force applied to the first mounting member in said opposite direction is transmitted to the second mounting member in a cushioned manner via said shock absorbing body.

3. A shock absorber according to claim 1, wherein said coupling member is formed with bifurcations adapted to straddle the rigid core when the coupling member is received through said opening in said sleeve, with the bifurcations of the coupling member engageing a face of said flange at the second projecting end of the rigid core.

4. The shock absorber according to claim 1, wherein said socket in the sleeve, and said shock absorbing body, are of complementary conical configuration.

5. The shock absorber according to claim 1, further including a ring secured to said first mounting member and circumscribing the lower portion of said shock absorber so as to limit the lateral deflection thereof.

6. The shock absorber according to claim 1, wherein said coupling member is of wedge shape such that inserting it further within said sleeve opening draws the rigid core and its shock absorbing body further within the sleeve.

7. The shock absorber according to claim 6, further including a locking member for locking said coupling member within said sleeve opening.

8. The shock absorber according to claim 7, wherein said locking member is receivable in said sleeve opening to engage a face of said coupling member, with one end of the locking member bent in one direction to overlie the outer face of said sleeve, and the opposite end of the locking member adapted to be bent in the opposite direction to overlie said coupling member.

9. The shock absorber according to claim 4, wherein said shock absorbing body includes an outer rigid jacket spaced from said rigid core by said resilient elastomeric material.

10. The shock absorber according to claim 9, wherein said rigid core is formed with at least one flange in its central portion embedded within said elastomeric material for anchoring the rigid core therein.

11. The shock absorber according to claim 10, wherein said rigid core is formed with a further flange at said first projecting end for spacing same from said first mounting member.

12. The shock absorber according to claim 10, wherein said first projecting end of the rigid core is formed with external threads for coupling same to said first mounting member.

13. A shock absorber mountable between first and second mounting members, comprising:
   a shock absorbing body of resilient elastomeric material;
   a rigid core extending through and fixedly embedded within said shock absorbing body;
   said rigid core including a first and projecting from one side of said shock absorbing body for coupling same to said first mounting member, and a second end projecting from the opposite side of said shock ansorning body for coupling same to said second mounting member;
   a coupling member engageable with said second projecting end of the rigid core for coupling same to the second mounting member such that a tensile force applied to said first mounting member in a first direction away from said second mounting member is transmitted to said second mounting member via said rigid core and said coupling member, and independently of said shock absorbing body; whereas a compressive force applied to said first mounting member in the opposite direction, towards said second mounting member, is transmitted to said second mounting member via said shock absorbing body;

and a ring secured to said first mounting member and circumscribing the lower portion of said shock absorber so as to limit the lateral deflection thereof.

14. A shock absorber according to claim 13, wherein said second projecting end of the rigid core is formed with a flange, said coupling member engaging said flange to couple same to the second mounting member.

15. A shock absorber accoding to claim 13, said shock absorber further including a sleeve adapted to be fixed to said second mounting member, said sleeve being formed with an axially-extending socket for receiving said shock absorbing body, and and with a transversely-extending opening at the flanged end of the rigid core.

16. A shock absorber according to claim 15, wherein said coupling member is formed with bifurcations adapted to straddle the rigid core when the coupling member is received through said opening in said sleeve, with the outer faces of the bifurcations of the coupling member engaging the inner face of said flange at the second projecting end of the rigid core.

17. The shock absorber according to claim 15, wherein said coupling member is of wedge shape such that inserting it further within said sleeve opening draws the rigid core and its shock absorbing body further within the sleeve.

* * * * *